United States Patent
Li et al.

(10) Patent No.: US 8,400,731 B1
(45) Date of Patent: Mar. 19, 2013

(54) WRITE HEAD WITH VARIABLE SIDE SHIELD GAPS

(75) Inventors: Shaoping Li, San Ramon, CA (US); Ge Yi, Pleasanton, CA (US); Feng Liu, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 911 days.

(21) Appl. No.: 12/426,264

(22) Filed: Apr. 19, 2009

(51) Int. Cl.
*G11B 5/127* (2006.01)

(52) U.S. Cl. ......... 360/125.01; 360/119.04; 360/119.11; 360/119.12; 360/119.13; 360/125.09; 360/125.1; 360/125.11; 360/125.13; 360/125.14; 360/125.15; 360/125.19; 360/125.2; 360/125.21; 360/125.25

(58) Field of Classification Search .......................... None
See application file for complete search history.

(56) References Cited

U.S. PATENT DOCUMENTS

| | | | |
|---|---|---|---|
| 7,002,775 B2 | 2/2006 | Hsu et al. | |
| 7,070,698 B2 | 7/2006 | Le | |
| 7,324,304 B1 | 1/2008 | Benakli et al. | |
| 7,367,112 B2 | 5/2008 | Nix et al. | |
| 7,467,461 B2 | 12/2008 | Bonhote et al. | |
| 7,649,712 B2 | 1/2010 | Le et al. | |
| 7,768,743 B2 | 8/2010 | Guthrie et al. | |
| 7,920,359 B2 | 4/2011 | Maruyama et al. | |
| 7,979,978 B2 | 7/2011 | Han et al. | |
| 8,120,874 B2* | 2/2012 | Hsiao et al. | 360/119.04 |
| 2006/0044681 A1 | 3/2006 | Le et al. | |
| 2006/0044682 A1 | 3/2006 | Le et al. | |
| 2006/0067005 A1 | 3/2006 | Jayasekara | |
| 2006/0082924 A1 | 4/2006 | Etoh et al. | |
| 2007/0253107 A1* | 11/2007 | Mochizuki et al. | 360/126 |
| 2008/0151437 A1 | 6/2008 | Chen et al. | |
| 2008/0180861 A1 | 7/2008 | Maruyama et al. | |
| 2008/0253035 A1 | 10/2008 | Han et al. | |
| 2008/0273276 A1 | 11/2008 | Guan | |
| 2008/0273277 A1 | 11/2008 | Guan et al. | |
| 2008/0278861 A1 | 11/2008 | Jiang et al. | |
| 2008/0304186 A1* | 12/2008 | Watanabe et al. | 360/319 |
| 2009/0091861 A1 | 4/2009 | Takano et al. | |
| 2009/0154019 A1 | 6/2009 | Hsiao et al. | |
| 2009/0154026 A1 | 6/2009 | Jiang et al. | |
| 2009/0168241 A1 | 7/2009 | Mochizuki et al. | |
| 2010/0061016 A1 | 3/2010 | Han et al. | |
| 2010/0155363 A1 | 6/2010 | Pentek et al. | |
| 2010/0302681 A1* | 12/2010 | Mino et al. | 360/125.03 |
| 2012/0012555 A1* | 1/2012 | Yan et al. | 216/22 |

OTHER PUBLICATIONS

Mallary et al., "One Terabit per Square Inch Perpendicular Recording Conceptual Design", IEEE Transactions on Magnetics, vol. 38, No. 4, Jul. 2002, pp. 1719-1724.

* cited by examiner

*Primary Examiner* — Kevin Bernatz

(57) ABSTRACT

A magnetic recording head comprises a write pole including a throat region with a leading edge, a trailing edge opposite the leading edge, and first and second side edges opposite one another. The magnetic recording head further comprises a first side wall gap layer disposed alongside the first side edge of the throat region, and a second side wall gap layer disposed alongside the second side edge of the throat region. Each of the first and second side wall gap layers has a first width at the leading edge of the throat region smaller than a second width at the trailing edge of the throat region.

13 Claims, 5 Drawing Sheets

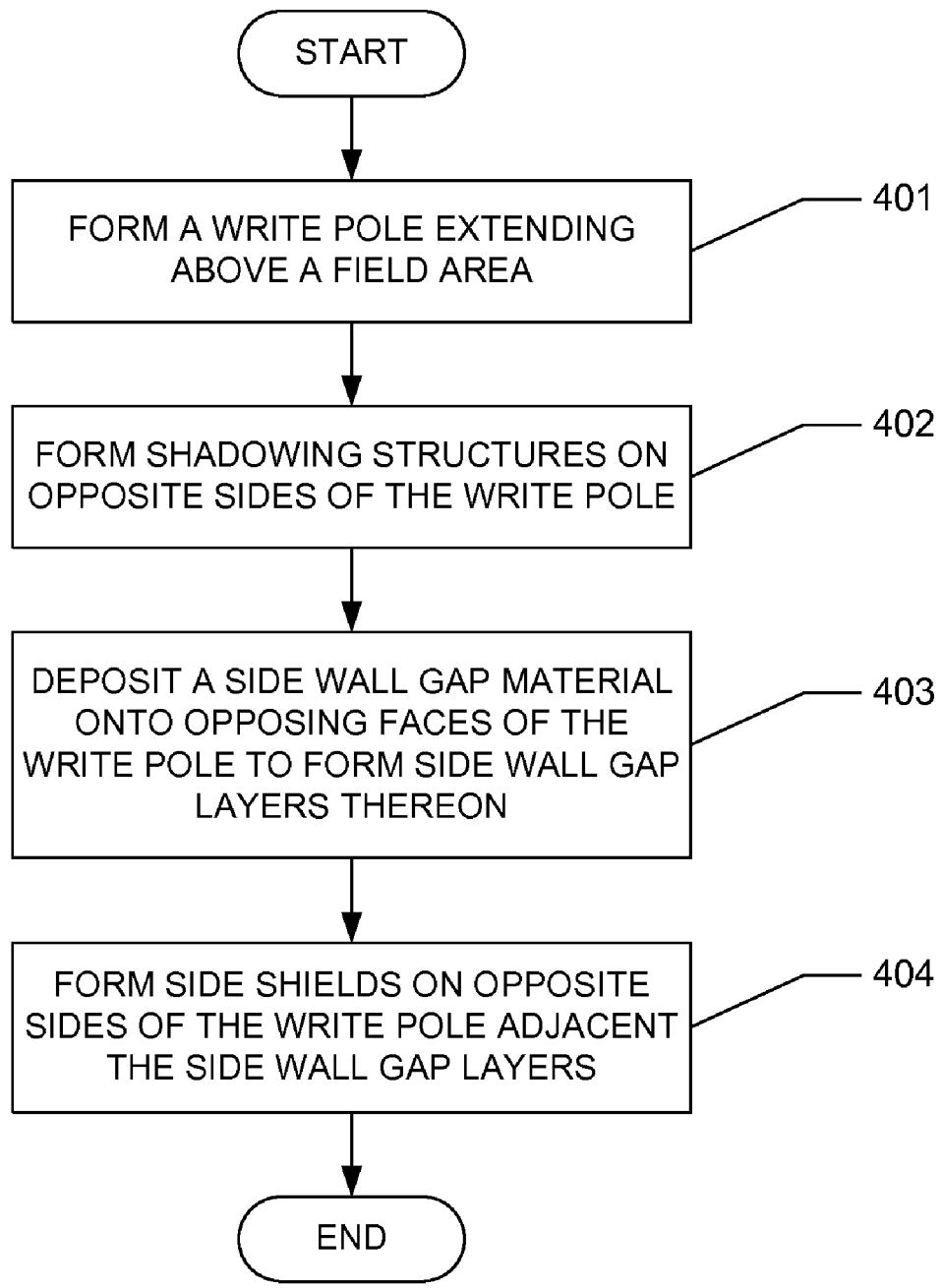

WRITE HEAD WITH VARIABLE SIDE SHIELD GAPS

FIELD OF THE INVENTION

The present invention generally relates to hard disk drives and, in particular, relates to a write head with variable side shield gaps.

BACKGROUND OF THE INVENTION

In order to increase the recording density of magnetic storage devices, the performance of the write head of a hard disk drive plays an increasingly important role. Current writers with trailing shields suffer from several major shortcomings. For example, the cross-track field gradients of such write heads are poor, which can result in adjacent track interference (ATI). In this regard, writers with trailing shields tend to have large stray fields, which can result in adjacent track erasure. One approach to solving this ATI issue involves providing "wrap-around" shields, in which additional shield layers are disposed on opposite sides of the write head in the cross-track direction. While many side shield configurations have been proposed, most present design and fabrication challenges, while still suffering from an unsatisfactory level of ATI.

SUMMARY OF THE INVENTION

Various embodiments of the present invention solve the foregoing problem by providing magnetic recording heads having variable side shield gaps, whereby a trailing edge of a side shield is spaced further (in the cross-track direction) from the magnetic pole than a leading edge thereof. This configuration enjoys improved cross-track field gradients, can be accomplished with mill & lap or damascene process flows, is compatible with beveled heads, and may permit the use of more easily-fabricated rectangular cross-sectional write poles.

According to one aspect of the subject disclosure, a magnetic recording head is provided. The magnetic recording head comprises a write pole including a throat region with a leading edge, a trailing edge opposite the leading edge, and first and second side edges opposite one another. The magnetic recording head further comprises a first side wall gap layer disposed alongside the first side edge of the throat region, and a second side wall gap layer disposed alongside the second side edge of the throat region. Each of the first and second side wall gap layers has a first width at the leading edge of the throat region smaller than a second width at the trailing edge of the throat region.

According to another aspect of the subject disclosure, a method of making a magnetic recording head comprises the steps of forming a write pole extending above a field area, forming shadowing structures on opposite sides of the write pole, and depositing a side wall gap material onto opposing faces of the write pole, whereby side wall gap layers are formed on the opposing faces of the writer pole. The shadowing structures are configured to shadow a lower portion of the write pole such that the deposited side wall gap layers are thinner adjacent the lower portion and thicker adjacent a region above the lower portion.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 4 is a flow chart illustrating a method of making a magnetic recording head in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
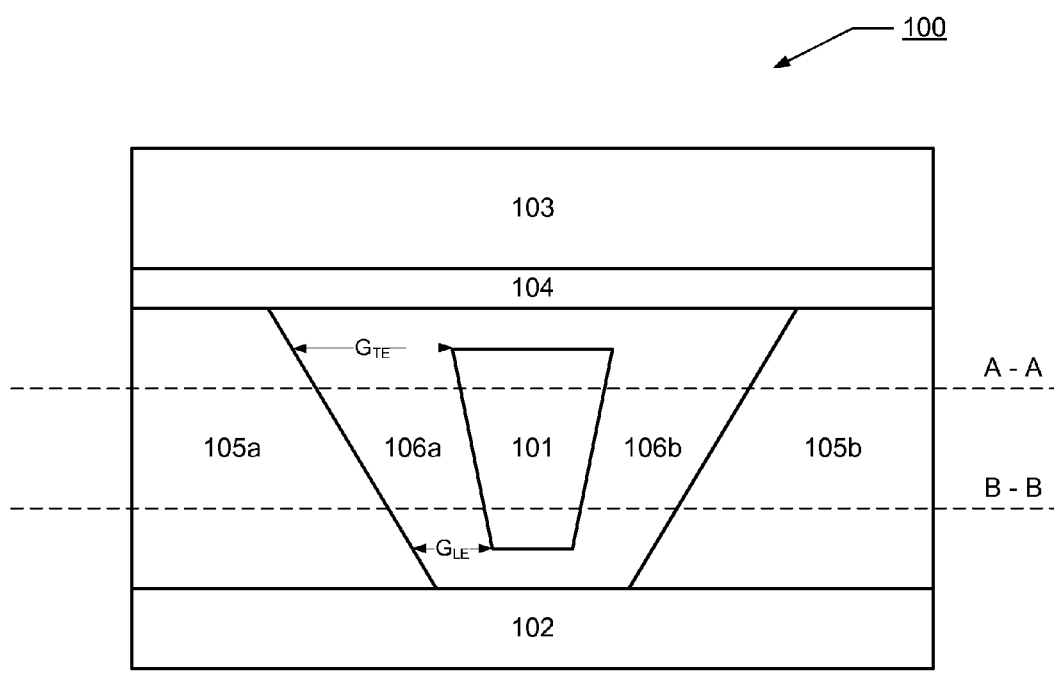
FIG. 1 illustrates a cross-sectional view of a magnetic recording head in accordance with one aspect of the subject disclosure.

FIG. 1 illustrates a cross-sectional view (from the perspective of the air bearing surface) of a magnetic recording head 100 in accordance with one aspect of the subject disclosure. Magnetic recording head includes a write pole 101 surrounded by a leading shield 102 and a trailing shield 103. Magnetic recording head may further include a write gap layer 104 separating a trailing edge of write pole 101 from trailing shield 103. Write pole 101 is further surrounded (in the cross-track direction) by two side shields 105a and 105b. Separating write pole 101 from side shields 105a and 105b are side gap layers 106a and 106b, respectively. As can be seen with reference to FIG. 1, each side gap layer is wider at the trailing edge of write pole 101 than at the leading edge thereof. In particular, at the trailing edge of write pole 101, side gap layer 106a has a width $G_{TE}$, and at the leading edge of write pole 101, side gap layer 106a has a width $G_{LE}$, where $G_{TE} > G_{LE}$. Side gap layer 106b is similarly configured, minoring side gap layer 106a.

According to one aspect of the subject disclosure, $G_{TE}$ may be between 4 and 8 times the write gap of the magnetic recording head, while $G_{LE}$ may be between 2 and 3.5 times the write gap of the magnetic recording head. The scope of the present invention is not limited to these particular dimensions, however, as a write pole may be provided with variable side gap layers of nearly any ratio of sizes.

Figure 2A:
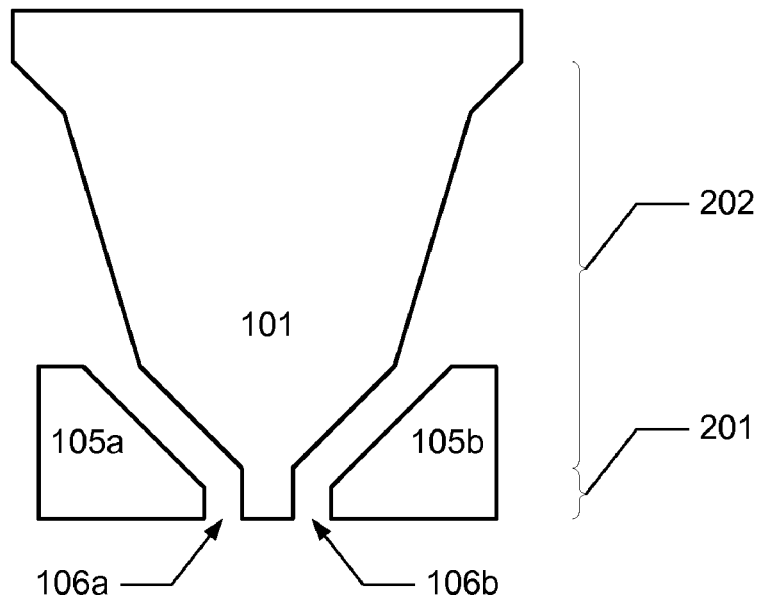
FIGS. 2A and 2B illustrate cross-sectional views of a magnetic recording head in accordance with one aspect of the subject disclosure.
Figure 2B:
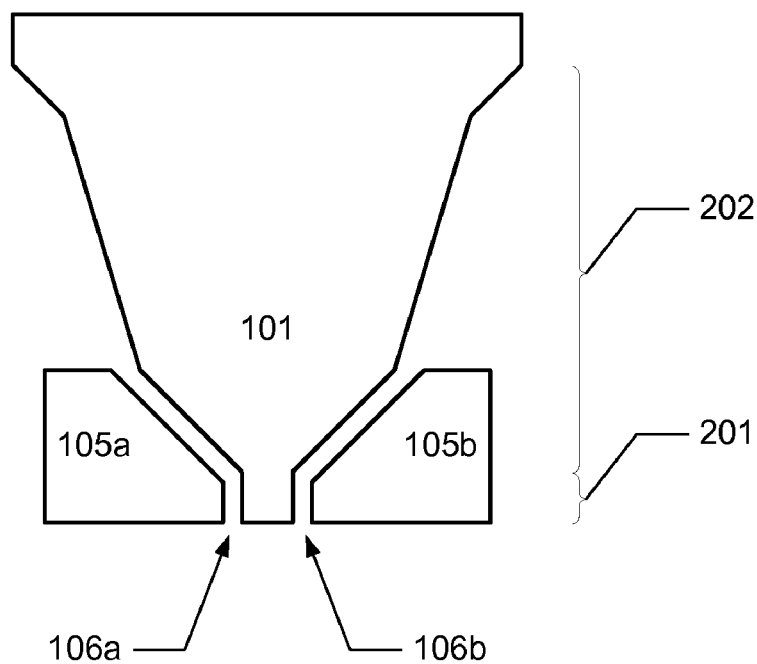

The variable width side gap layers 105a and 105b extend away from the air bearing surface (e.g., along the nose length of write pole 101), as can be seen with reference to FIGS. 2A and 2B, which illustrate magnetic recording head 100 in cross-section along planes A-A and B-B, respectively, in accordance with one aspect of the subject disclosure. As can be seen when comparing FIG. 2A to FIG. 2B, side gap layers 106a and 106b are wider nearer the trailing edge of write pole 101 (e.g., in FIG. 2A) than they are near the leading edge of write pole 101 (e.g., in FIG. 2B).

According to one aspect of the subject disclosure, the side shields 105a and 105b extend along a throat region 201 of write pole 201 and partway along a yoke region 202 thereof. Accordingly, as can be seen with reference to FIGS. 2A and 2B, variable width side gap layers 106a and 106b also extend along the throat region 201 and partway along the yoke region 202 of write pole 101, conformal with write pole 101.

According to one aspect of the subject disclosure, side gap layers 106a and 106b are symmetric (e.g., minor images of one another). The scope of the present invention is not limited to such an arrangement, however, as a magnetic recording head may comprise a write pole surrounded by side gap layers of differently varying widths. Moreover, while the foregoing exemplary magnetic recording head is illustrated as having side gap layers with linearly increasing width from the leading edge to the trailing edge, the scope of the present invention is not limited to such an arrangement. Rather, magnetic recording heads may comprise a write pole surrounded by side gap layers that increase in width from the leading edge to the trailing edge non-linearly, discontinuously (e.g., in steps, or with regions of lesser width between regions of greater width), or in any number of other manners readily understood by those of skill in the art.

A magnetic recording head configured with a write pole surrounded by side gap layers of varying width, such as magnetic recording head 100, enjoys a number of performance advantages and ease of manufacture when compared with other magnetic recording head designs. For example, the larger side gap layer at the trailing edge of the write pole ensures that more magnetic flux passes through the leading edge regions of the side shields during an operation of the magnetic recording head than through the trailing edge regions thereof. Such an effect makes it possible to use a write pole with a rectangular cross-section (as viewed from the ABS) with a head field bubble similar to that of a trapezoidal cross-sectional pole which lacks the variable side shield gap layers. As will be readily understood by those of requisite skill in the art, a write pole with a rectangular cross section is far simpler to manufacture using simpler wafer fabrication techniques.

Figure 3A:
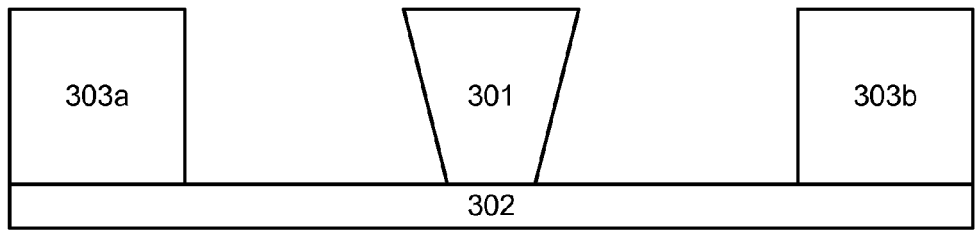
FIGS. 3A-3C graphically illustrate a method of making a magnetic recording head in accordance with one aspect of the subject disclosure.
Figure 3B:
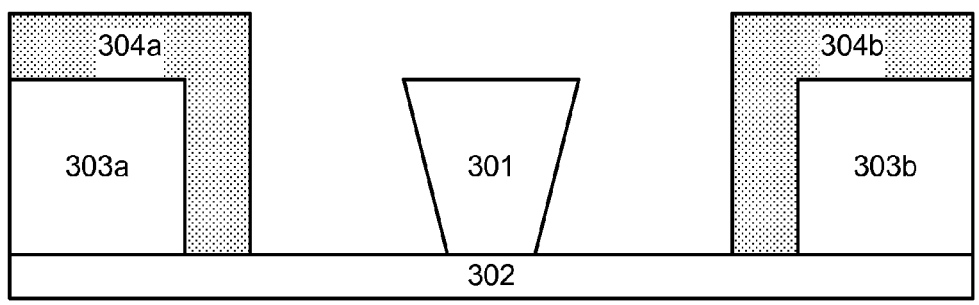
Figure 3C:
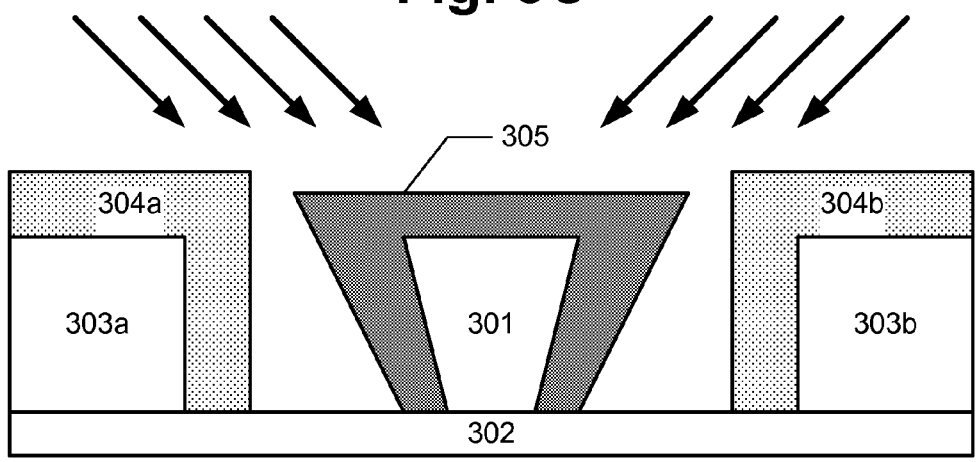

Turning to FIGS. 3A-3C, a method of making a magnetic recording head is graphically illustrated in accordance with one aspect of the subject disclosure. In FIG. 3A, a write pole 301 is illustrated in cross section (from an ABS view). Write pole 301 is formed over substrate 302 (e.g., by a damascene process, or by an additive "mill and lap" process). On either side of write pole 301 are illustrated regions of magnetic pole material from which write pole 301 has been formed, which regions 303a and 303b have not been stripped away from the wafer. It should be noted that FIG. 3A is not illustrated to scale, as the field area between write pole 301 and regions 303a and 303b may be many orders of magnitude larger than is illustrated in FIG. 3A. To facilitate the formation of variable side gap layers on write pole 301, shadowing structures 304a and 304b are formed on opposite sides thereof, as illustrated in FIG. 3B. These shadowing structures will allow a side gap material to be preferentially deposited on upper regions of write pole 301, as illustrated in FIG. 3C. The shadowing structures 304a and 304b may be formed by spin coating a photoresist material, or may be any other suitable material known to those of skill in the art, and may be formed on opposite sides of write pole 301 by any one of a number of methods well known to those of skill in the art. Moreover, it is not necessary that shadowing structures 304a and 304b be formed over pre-existing regions of the magnetic pole material layer, and may be formed directly upon substrate 302.

FIG. 3C illustrates the deposition of a side gap material 305 on either side of trapezoidal write pole 301 (and over the top of write pole 301, where side gap material 305 may be left to function as a write gap material, or from where side gap material 305 may be removed in a subsequent processing step). As can be seen with reference to FIG. 3C, the shadowing structures have partially shadowed lower regions of write pole 301, such that side gap material 305 has been preferentially deposited on upper regions of write pole 301, whereby the width of side gap material 305 at a trailing edge (the upper edge in FIG. 3C) of write pole 301 is greater than a width of side gap material 305 at a leading edge (the lower edge in FIG. 3C) of write pole 301. According to one aspect of the subject disclosure, following the deposition of the variable side gap layers on write pole 301, subsequent processing steps may provide write pole 301 with a beveled upper surface, without negatively impacting the variable side gap layers.

While in the foregoing exemplary embodiments, the write pole has been illustrated as trapezoidal, the scope of the present invention is not limited to such an arrangement. Rather, as will be readily understood by those of skill in the art, the present invention has application to write poles with any one of a number of cross-sectional shapes, including trapezoidal, triangular, rectangular, and any other cross-sectional shape known by those of skill in the art to be suitable for a write pole.

FIG. 4 is a flow chart illustrating a method of making a magnetic recording head in accordance with one aspect of the subject disclosure. The method begins in step 401, in which a write pole is formed extending above a field area. In step 402, shadowing structures are formed on opposite sides of the write pole. A side wall gap material is deposited onto opposing faces of the write pole in step 403, whereby side wall gap layers are formed on the opposing faces of the writer pole. The shadowing structures are configured to shadow a lower portion of the write pole such that the deposited side wall gap layers are thinner adjacent the lower portion and thicker adjacent a region above the lower portion.

Figure 5A:
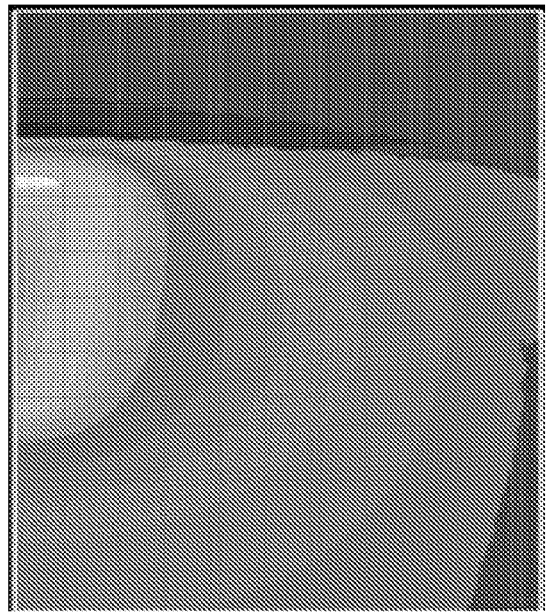
FIGS. 5A and 5B are FEM field contours of write heads with and without variable side shield gaps, in accordance with one aspect of the subject disclosure.
Figure 5B:
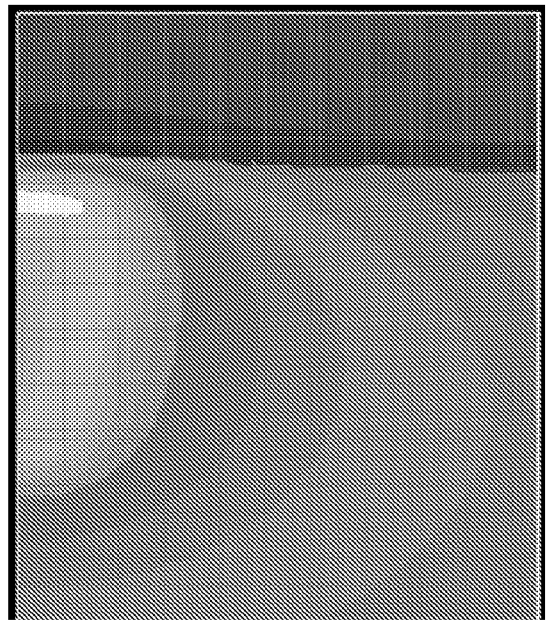

FIGS. 5A and 5B are FEM field contours of write heads with and without variable side shield gaps, respectively, in accordance with one aspect of the subject disclosure. As can be seen when comparing FIG. 5A (the FEM field contour of a write head with variable side shield gaps) to FIG. 5B, the FEM field contour of FIG. 5A has a much improved field gradient in the cross-track direction, which provides for greatly improved ATI performance.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A magnetic recording head, comprising:
   a write pole comprising a throat region with a leading edge, a trailing edge opposite the leading edge, and first and second side edges opposite one another;
   a first side wall gap layer disposed alongside the first side edge of the throat region;
   a second side wall gap layer disposed alongside the second side edge of the throat region;
   a first side shield disposed alongside the first side wall gap layer and extending at least from the leading edge to the trailing edge; and
   a second side shield disposed alongside the second side wall gap layer and extending at least from the leading edge to the trailing edge;
   wherein each of the first and second side wall gap layers has a first width at the leading edge of the throat region smaller than a second width at the trailing edge of the throat region, and wherein a width of the first and second side wall gap layers monotonically increases from the leading edge of the throat region to the trailing edge of the throat region.

2. The magnetic recording head of claim 1, wherein the first width of the first side wall gap layer and the first width of the second side wall gap layer are a same width.

3. The magnetic recording head of claim 1, wherein the second width of the first side wall gap layer and the second width of the second side wall gap layer are a same width.

4. The magnetic recording head of claim 1, wherein the first side shield is spaced the first width of the first side wall gap layer from the throat region at the trailing edge thereof and is spaced the second width of the first side wall gap layer from the throat region at the leading edge thereof.

5. The magnetic recording head of claim 1, wherein the second side shield is spaced the first width of the second side wall gap layer from the throat region at the trailing edge thereof and is spaced the second width of the second side wall gap layer from the throat region at the leading edge thereof.

6. The magnetic recording head of claim 1, wherein, for each the first and second side shields, more magnetic flux passes through a leading edge region thereof near the leading edge of the throat region during an operation of the magnetic recording head than through a trailing edge region thereof near the trailing edge of the throat region.

7. The magnetic recording head of claim 1, wherein the throat region of the write pole has a trapezoidal cross-sectional shape at an air bearing surface of the magnetic recording head.

8. The magnetic recording head of claim 1, wherein the throat region of the write pole has a triangular cross-sectional shape at an air bearing surface of the magnetic recording head.

9. The magnetic recording head of claim 1, wherein the throat region of the write pole has a rectangular cross-sectional shape at an air bearing surface of the magnetic recording head.

10. The magnetic recording head of claim 1, wherein the trailing edge of the throat region is beveled near an air bearing surface of the magnetic recording head.

11. The magnetic recording head of claim 1, wherein the write pole further comprises a yoke region, and wherein the first and second side wall gap layers extend along a portion of the yoke region.

12. The magnetic recording head of claim 1 wherein the width of the first and second side wall gap layers linearly increases from the leading edge of the throat region to the trailing edge of the throat region.

13. The magnetic recording head of claim 1 wherein the first and second side wall gap layers each has an outer surface opposite from the write pole, the outer surface having a smooth profile from the leading edge to the trailing edge.

* * * * *